(12) United States Patent
Ho (10) Patent No.: US 8,656,239 B2
(45) Date of Patent: Feb. 18, 2014

(54) CONTROL OF DATA TRANSMISSION BASED ON HARQ IN A WIRELESS COMMUNICATION SYSTEM

(75) Inventor: Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 912 days.

(21) Appl. No.: 12/368,968

(22) Filed: Feb. 10, 2009

(65) Prior Publication Data

US 2009/0204867 A1 Aug. 13, 2009

Related U.S. Application Data

(60) Provisional application No. 61/028,159, filed on Feb. 12, 2008.

(51) Int. Cl.
*G08C 25/02* (2006.01)
(52) U.S. Cl.
USPC .......................................... 714/748; 714/749
(58) Field of Classification Search
USPC .................................................. 714/748, 749
See application file for complete search history.

(56) References Cited

U.S. PATENT DOCUMENTS

| | | | |
|---|---|---|---|
| 5,535,214 A | 7/1996 | Shiobara | |
| 5,592,470 A | 1/1997 | Rudrapatna et al. | |
| 6,046,980 A | 4/2000 | Packer | |
| 6,134,218 A | 10/2000 | Holden | |
| 6,192,422 B1 | 2/2001 | Daines et al. | |
| 6,469,991 B1 | 10/2002 | Chuah | |
| 6,834,185 B2 | 12/2004 | Fujii | |
| 7,127,255 B2 | 10/2006 | Hsu et al. | |
| 7,167,487 B2 | 1/2007 | Herrmann | |
| 7,508,762 B2 | 3/2009 | Ohtani | |

(Continued)

FOREIGN PATENT DOCUMENTS

| | | |
|---|---|---|
| CN | 1478345 A | 2/2004 |
| CN | 1689261 A | 10/2005 |

(Continued)

OTHER PUBLICATIONS

3GPP TS 36.321, V8.0.0, Medium Access Control Protocol Specification Dec. 1, 2007, [Online] Dec. 1, 2007, pp. 1-23, XP002521635 Retrieved from the Internet : URL: http://www.quintillion.co.jp/3GPP/Specs/36321-800. pdf.

(Continued)

*Primary Examiner* — Yolanda L Wilson
(74) *Attorney, Agent, or Firm* — Nerrie M. Zohn (57) ABSTRACT

Techniques for controlling data transmission in a wireless communication system based on hybrid automatic retransmission (HARQ) are described. In one design, a user equipment (UE) may determine the number of HARQ processes (Z) supported by the UE, e.g., based on the amount of resources available at the UE. The UE may send information indicative of the number of HARQ processes supported by the UE to a Node B. The UE may thereafter receive data from the Node B on up to Z HARQ processes. In one design, the UE may receive data for non-guaranteed bit rate (non-GBR) traffic on up to Z HARQ processes and may receive data for guaranteed bit rate (GBR) traffic on up to all HARQ processes available in the system. In another design, the UE may receive data for both GBR traffic and non-GBR traffic on up to Z HARQ processes.

54 Claims, 6 Drawing Sheets

(56) References Cited

U.S. PATENT DOCUMENTS

| | | | |
|---|---|---|---|
| 7,710,893 B2 | 5/2010 | Yoon et al. | |
| 7,764,661 B2* | 7/2010 | Heo et al. | 370/342 |
| 8,005,089 B2* | 8/2011 | Chun et al. | 370/394 |
| 2003/0035383 A1 | 2/2003 | Hershey | |
| 2003/0104817 A1 | 6/2003 | Damnjanovic | |
| 2003/0147371 A1 | 8/2003 | Choi et al. | |
| 2003/0222817 A1 | 12/2003 | Gfeller et al. | |
| 2004/0017795 A1 | 1/2004 | Abraham et al. | |
| 2004/0203973 A1 | 10/2004 | Khan | |
| 2005/0111451 A1 | 5/2005 | Kim | |
| 2005/0143084 A1 | 6/2005 | Cheng et al. | |
| 2005/0250454 A1 | 11/2005 | Sebire et al. | |
| 2005/0256886 A1 | 11/2005 | Armanino et al. | |
| 2005/0265301 A1 | 12/2005 | Heo et al. | |
| 2005/0276359 A1 | 12/2005 | Xiong | |
| 2006/0146875 A1 | 7/2006 | Yang | |
| 2006/0182080 A1 | 8/2006 | Yang et al. | |
| 2007/0019552 A1 | 1/2007 | Senarath et al. | |
| 2007/0189248 A1* | 8/2007 | Chang et al. | 370/338 |
| 2007/0201369 A1 | 8/2007 | Pedersen et al. | |
| 2007/0245202 A1* | 10/2007 | Kim et al. | 714/748 |
| 2007/0248035 A1 | 10/2007 | Sang et al. | |
| 2008/0002688 A1* | 1/2008 | Kim et al. | 370/389 |
| 2008/0004030 A1 | 1/2008 | Frederiksen et al. | |
| 2008/0026744 A1 | 1/2008 | Frederiksen et al. | |
| 2008/0109694 A1* | 5/2008 | Jen | 714/748 |
| 2008/0117881 A1 | 5/2008 | Golitschek Edler Von Elbwart et al. | |
| 2008/0161033 A1 | 7/2008 | Borran et al. | |
| 2008/0232284 A1 | 9/2008 | Dalsgaard et al. | |
| 2008/0240030 A1 | 10/2008 | Kolding et al. | |
| 2008/0310345 A1 | 12/2008 | Chun et al. | |
| 2009/0092148 A1 | 4/2009 | Zhang et al. | |
| 2009/0109907 A1 | 4/2009 | Tsai et al. | |
| 2009/0122776 A1 | 5/2009 | Folkstedt et al. | |
| 2009/0141668 A1 | 6/2009 | Zhang et al. | |
| 2009/0141676 A1* | 6/2009 | Maheshwari et al. | 370/329 |
| 2009/0161545 A1 | 6/2009 | Ho et al. | |
| 2009/0196275 A1 | 8/2009 | Damnjanovic et al. | |
| 2009/0196364 A1 | 8/2009 | Nakajima et al. | |
| 2010/0095183 A1* | 4/2010 | Petrovic et al. | 714/748 |
| 2010/0198943 A1 | 8/2010 | Harrang et al. | |
| 2010/0235705 A1* | 9/2010 | Kim et al. | 714/749 |
| 2010/0254480 A1 | 10/2010 | Park et al. | |
| 2010/0281325 A1* | 11/2010 | Lohr et al. | 714/749 |

FOREIGN PATENT DOCUMENTS

| | | |
|---|---|---|
| CN | 1799231 A | 7/2006 |
| CN | 1910886 A | 2/2007 |
| CN | 1961502 A | 5/2007 |
| CN | 101056469 A | 10/2007 |
| CN | 02814094 | 5/2012 |
| EP | 627827 | 12/1994 |
| EP | 1071226 | 1/2001 |
| EP | 1341336 A1 | 9/2003 |
| EP | 1353483 A2 | 10/2003 |
| EP | 1389847 A1 | 2/2004 |
| EP | 1389847 A1 * | 2/2004 |
| EP | 1511239 A2 | 3/2005 |
| JP | 2000183884 A | 6/2000 |
| JP | 2005073276 | 3/2005 |
| JP | 2005536159 A | 11/2005 |
| JP | 2006287522 A | 10/2006 |
| JP | 2007529938 A | 10/2007 |
| JP | 2007536826 A | 12/2007 |
| JP | 2008503182 A | 1/2008 |
| JP | 2009521872 | 6/2009 |
| JP | 2009525655 A | 7/2009 |
| JP | 2012114957 A | 6/2012 |
| KR | 20070024427 | 3/2007 |
| RU | 2149518 | 5/2000 |
| RU | 2216868 C2 | 11/2003 |
| RU | 2280958 C2 | 7/2006 |
| WO | WO9835525 | 8/1998 |
| WO | WO0072622 A1 | 11/2000 |
| WO | 0101624 A1 | 1/2001 |
| WO | WO0241531 | 5/2002 |
| WO | WO02052800 A1 | 7/2002 |
| WO | WO02101956 A1 | 12/2002 |
| WO | 03047206 A1 | 6/2003 |
| WO | 2004019543 A1 | 3/2004 |
| WO | 2004042963 A1 | 5/2004 |
| WO | WO2004109991 | 12/2004 |
| WO | WO2005067262 | 7/2005 |
| WO | 2005109727 A1 | 11/2005 |
| WO | 05125020 A1 | 12/2005 |
| WO | WO2005125226 A2 | 12/2005 |
| WO | 2006030019 A2 | 3/2006 |
| WO | 2006049438 A1 | 5/2006 |
| WO | 2006051149 A1 | 5/2006 |
| WO | 2006104344 | 10/2006 |
| WO | 2006109123 A2 | 10/2006 |
| WO | WO2007024120 A1 | 3/2007 |
| WO | 2007078173 A1 | 7/2007 |
| WO | 07087057 | 8/2007 |

OTHER PUBLICATIONS

International Search Report and Written Opinion—PCT/US2009/033810, International Search Authority—European Patent Office—Aug. 5, 2009.

Motorola: "Flow control" 3GPP DRAFT, R2-073540, Athens, Greece, Aug. 20-24, 2007 pp. 1-2.

Nec, et al: "DL flow control in LTE" 3GPP DRAFT, R2-081777, Shenzhen, China, Mar. 31-Apr. 4, 2008, Ch 2.1 Solutions.

Panasonic: "MAC flow control and related signaling" 3GPP DRAFT, R2-074147, Shanghai, China, Oct. 8-12, 2007.

Philips: "UE flow control when relaying to other interfaces e.g. to a bluetooth link" 3GPP DRAFT, TSGR2#32(02)2628, RAN WG2, Sep. 23-27, 2002, Xian, China, p. 2.

QUALCOMM Europe: "DL flow control in LTE" 3GPP DRAFT, R2-080374, Sevilla, Spain, Jan. 14-18, 2008, pp. 1-2.

Rapporteur: "Draft TR 25.877 v2.0.0: High speed downlink packet access: Iub/Iur protocol aspects" 3GPP DRAFT, R3-020892, Orlando, FL US, Feb. 18-22, 2002, pp. 47-49.

The CDMA 2000 ITU-R RTT Candidate Submission 0,19 Online Jul. 27, 1998.

Qualcomm Europe: "Happy Bits", 3GPP TSG-RAN WG2 #61, R2-081065, Feb. 11, 2008.

IEEE Computer Society and the IEEE Microwave Theory and Techniques Society: "IEEE Standard for Local and metropolitan area networks—Part 16: Air Interface for Fixed and Mobile Broadband Wireless Access Systems; Amendment 2: Physical and Medium Access Control Layers for Combined Fixed and Mobile Operation in Licensed Bands and Corrigendum 1"; IEEE Std 802.16e-2005 and IEEE Std 802.16/2004/Cor1-2005 (Feb. 28, 2006), XP017601713.

* cited by examiner

CONTROL OF DATA TRANSMISSION BASED ON HARQ IN A WIRELESS COMMUNICATION SYSTEM

The present application claims priority to provisional U.S. Application Ser. No. 61/028,159, entitled "METHODS AND APPARATUSES FOR DOWNLINK FLOW CONTROL," filed Feb. 12, 2008, assigned to the assignee hereof and incorporated herein by reference.

BACKGROUND

I. Field

The present disclosure relates generally to communication, and more specifically to techniques for controlling data transmission in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of Node Bs that can support communication for a number of user equipments (UEs). A UE may support various applications (e.g., voice, video, email, text messaging, etc.) that may run concurrently. Each application may require a certain amount of resources at the UE, e.g., processing resources, buffers, battery power, etc. The amount of resources required by all active applications may change dynamically.

The UE may be designed to handle the worst-case load condition and may be dimensioned with the sum of the resource requirements of all applications installed at the UE. The worst-case load condition may occur when all of the applications are active at the same time and the UE is receiving data at peak rates for all applications currently. However, designing the UE for the worst-case load condition may greatly increase the cost of the UE and may not be justified since this situation may rarely occur, if at all.

In order to keep cost at a reasonable level, the UE may be designed to handle common load conditions, which may require significantly less resources than the worst-case load condition. However, if the UE is designed to handle the common load conditions, then the UE may run low on resources in some scenarios. It may be desirable to effectively handle the scenarios in which the UE runs low on resources.

SUMMARY

Techniques for controlling data transmission in a wireless communication system based on hybrid automatic retransmission (HARQ) are described herein. The system may support multiple (M) HARQ processes, and each HARQ process may be used to send one or more packets of data at any given moment. In an aspect, a receiver may indicate its current capability to receive data in terms of the number of HARQ processes that it can support. A transmitter may then limit the number of HARQ processes to use to send data to the receiver based on the number of HARQ processes supported by the receiver.

In one design of data transmission on the downlink, a UE may determine the number of HARQ processes (Z) supported by the UE, e.g., based on the amount of resources available at the UE. The UE may send information indicative of the number of HARQ processes supported by the UE to a Node B. The UE may thereafter receive data from the Node B on up to Z HARQ processes. In one design, the UE may receive data for non-guaranteed bit rate (non-GBR) traffic on up to Z HARQ processes and may receive data for guaranteed bit rate (GBR) traffic on up to M HARQ processes available in the system. In another design, the UE may receive data for both GBR traffic and non-GBR traffic on up to Z HARQ processes. The UE may also receive data for GBR traffic and non-GBR traffic in other manners.

The techniques may also be used for data transmission on the uplink. Various aspects and features of the disclosure are described in further detail below.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3 GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE.

Figure 1:
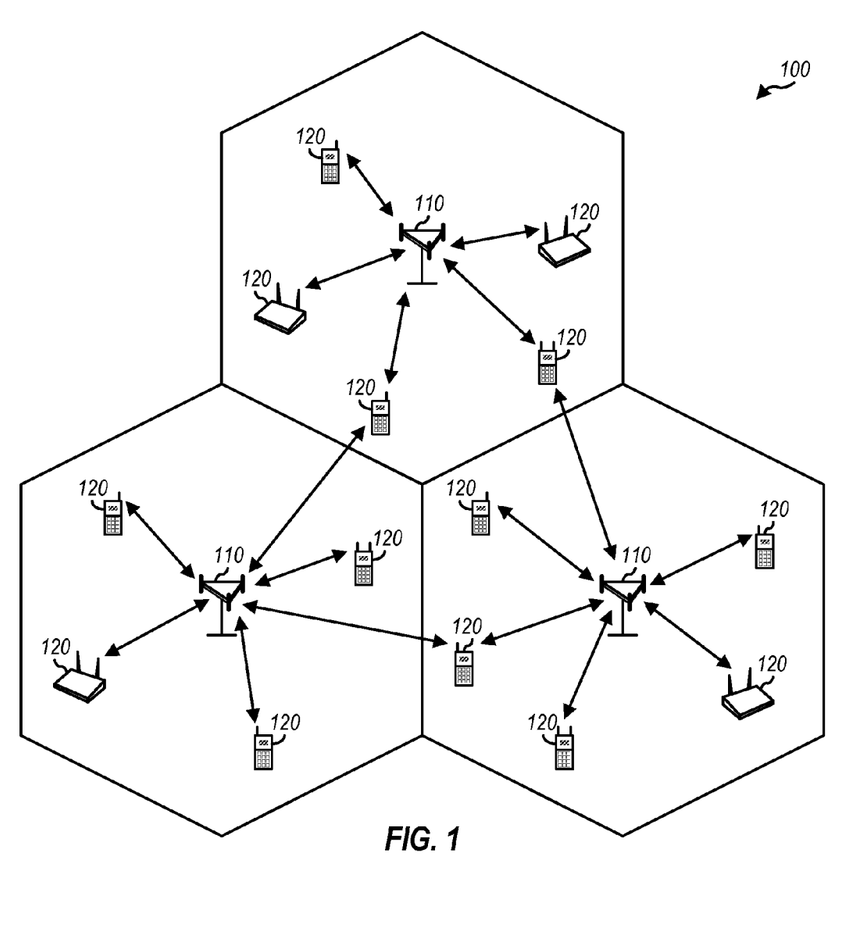
FIG. 1 shows a wireless communication system.

FIG. 1 shows a wireless communication system 100, which may be an LTE system. System 100 may include a number of Node Bs 110 and other network entities. A Node B may be a station that communicates with the UEs and may also be referred to as an evolved Node B (eNB), a base station, an access point, etc. UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may communicate with a Node B via the downlink and uplink. The downlink (or forward link) refers to the communication link from the Node B to the UE, and the uplink (or reverse link) refers to the communication link from the UE to the Node B.

The system may support HARQ in order to improve reliability of data transmission and support rate adaptation for varying channel conditions. For HARQ, a transmitter may send a transmission of a packet and may send one or more additional transmissions, if needed, until the packet is decoded correctly by a receiver, or the maximum number of transmissions has been sent, or some other termination condition is encountered. A packet may also be referred to as a transport block, a codeword, etc.

Figure 2:
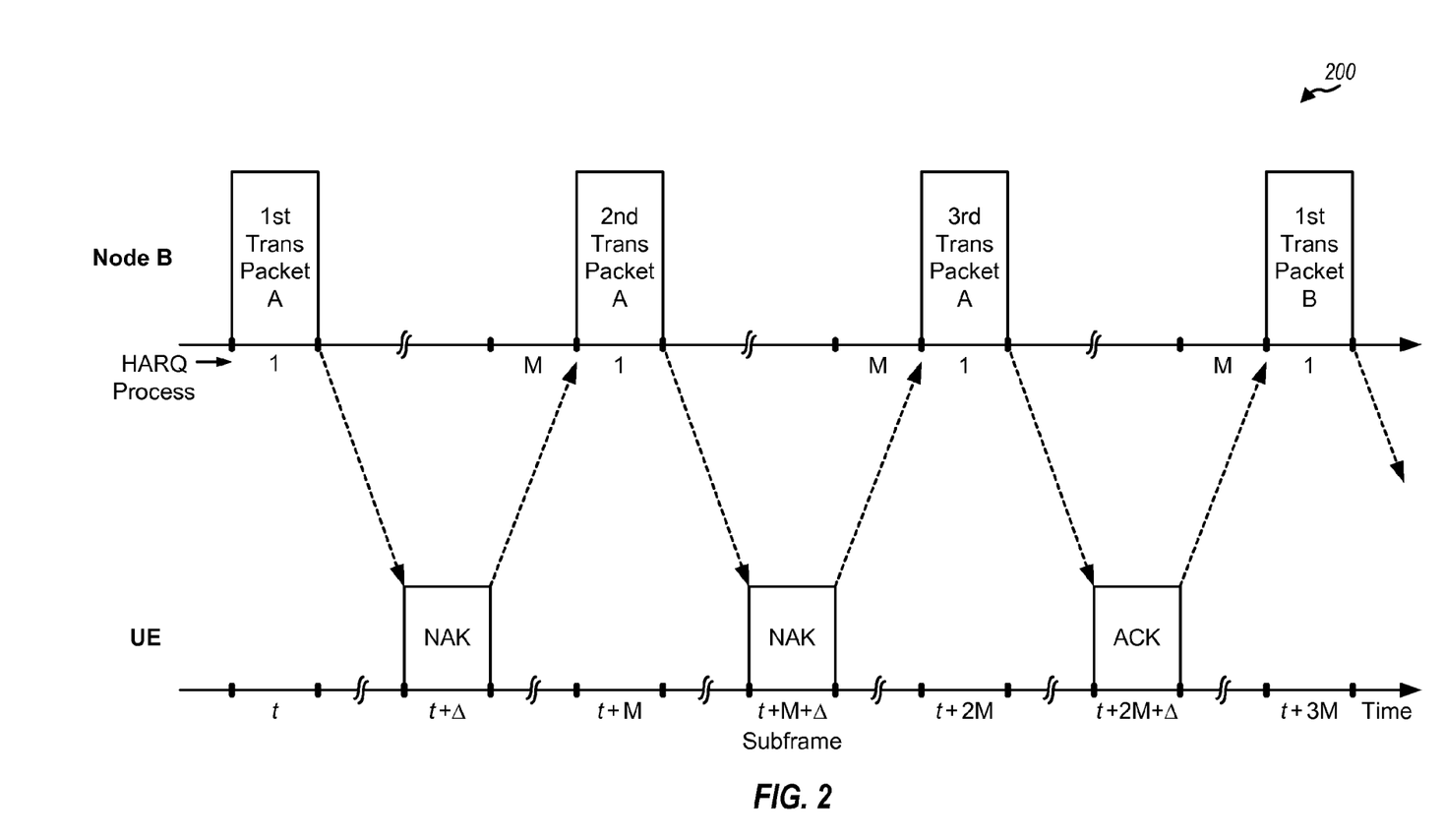
FIG. 2 shows data transmission on the downlink with HARQ.

FIG. 2 shows an example of data transmission on the downlink with HARQ. The transmission timeline may be partitioned into units of subframes. Each subframe may cover a predetermined time duration, e.g., 1 milliseconds (ms) in LTE.

In the example shown in FIG. 2, a Node B may have data to send to a UE and may process a data packet A in accordance with a selected transport format to obtain data symbols. A transport format may also be referred to as a rate, a packet format, a modulation and coding scheme (MCS), etc. The Node B may send a first transmission of packet A as well as control information to the UE in subframe t. The control information may indicate the selected transport format, the radio resources used for data transmission, etc. The UE may receive and process the first transmission in accordance with the selected transport format. The UE may decode packet A in error and may send a negative acknowledgement (NAK) in subframe t+Δ. The Node B may receive the NAK and send a second transmission of packet A in subframe t+M. The UE may receive the second transmission and process the first and second transmissions in accordance with the selected transport format. The UE may again decode packet A in error and may send another NAK in subframe t+M+Δ. The Node B may receive the NAK and send a third transmission of packet A in subframe t+2M. The UE may receive the third transmission and process the first, second and third transmissions in accordance with the selected transport format. The UE may decode packet A correctly and may send an acknowledgement (ACK) in subframe t+2M+Δ. The Node B may receive the ACK and may then process and send another data packet B in similar manner.

The Node B may process and send a packet such that it can be decoded correctly with high probability after a target number of transmissions. Each transmission of the packet may be referred to as an HARQ transmission and may include different redundancy information (e.g., a different set of data symbols) for the packet. The target number of transmissions may also be referred to as a target termination for the packet. A transport format may be selected for the packet based on received signal quality such that the target termination can be achieved for the packet.

The system may support synchronous HARQ and/or asynchronous HARQ. For synchronous HARQ, transmissions of a packet may be sent in subframes that are known a priori by a transmitter and a receiver. For asynchronous HARQ, transmissions of a packet may be scheduled and sent in any subframes. The techniques described herein may be used for both synchronous HARQ and asynchronous HARQ.

Figure 3:
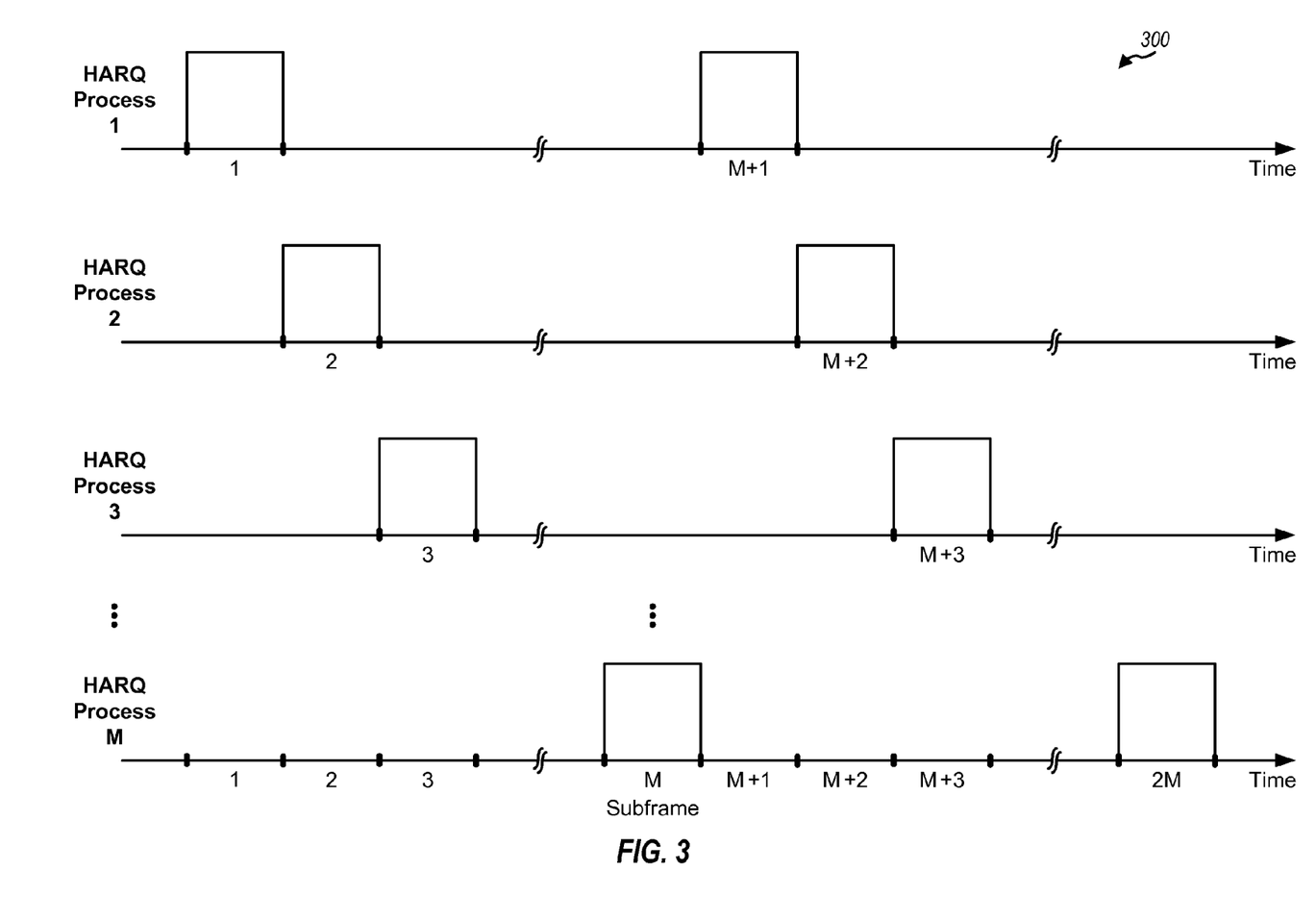
FIG. 3 shows multiple HARQ processes for synchronous HARQ.

FIG. 3 shows a design of synchronous HARQ. M HARQ processes with indices of 1 through M may be defined for each of the downlink and uplink, where M may be equal to 4, 6, 8 or some other value. The HARQ processes may also be referred to as HARQ interlaces, HARQ instances, etc. Each HARQ process may include subframes that are spaced apart by M subframes. For example, HARQ process m may include subframes m, M+m, 2M+m, etc., where m∈{ 1, . . . , M}. A packet may be sent on one HARQ process, and all transmissions of the packet may be sent in subframes that are spaced apart by M subframes.

For asynchronous H-ARQ, each HARQ transmission may be scheduled by a Node B and may be sent in any subframe. For a given packet, the amount of radio resources, the specific radio resources, the transport format and/or other parameters may change for different transmissions of the packet.

A UE may support guaranteed bit rate (GBR) traffic and non-guaranteed bit rate (non-GBR) traffic. GBR traffic is data that requires a certain guaranteed bit rate in order to achieve satisfactory performance. Some examples of GBR traffic include data for voice, Voice-over-Internet Protocol (VoIP), video, etc. Mon-GBR traffic is data that does not require a guaranteed bit rate and is typically more tolerant to delay. Some examples of non-GBR traffic include data for file downloading, web browsing, text messaging, etc. To achieve good user experience, sufficient resources may be allocated at the UE as well as a Node B for GBR traffic. Non-GBR traffic may then be supported with the remaining available resources.

The UE may need to handle very high data rates, especially in LTE and other systems supporting high-speed data transmission. The UE may have limited resources (e.g., limited processing, memory, power, and/or other resources) for cost effective implementation. The UE may run low on resources during some scenarios, e.g., when an application is launched with the UE receiving data at a high rate. In such scenarios, it may be beneficial for the UE to send signaling to the Node B to request the Node B to reduce data transmission on the downlink in order to alleviate resource requirements at the UE. When the UE resources are back to normal level, the UE may request the Node B to resume normal data transmission.

In an aspect, the UE may indicate its current capability to receive data in terms of the number of HARQ processes that it can support. The UE may support an overall peak rate of $R_{max}$ when a Node B sends data using all M HARQ processes available in the system. The UE may support a peak rate of $R_{peak}=R_{max}/M$ for each HARQ process used by the Node B for data transmission to the UE. The UE may determine the peak rate that it can support (e.g., for non-GBR traffic) based on the amount of resources available at the UE (e.g., for non-GBR traffic). The peak rate supported by the UE may be a function of the available processing resources, memory resources, battery resources, etc.

In one design, the UE may determine the number of HARQ processes that it can support based on the supported peak rate, as follows:

$$Z = \left\lfloor \frac{R_{supported}}{R_{peak}} \right\rfloor, \qquad \text{Eq (1)}$$

where $R_{supported}$ is the peak rate supported by the UE for all HARQ processes, Z is the number of HARQ processes supported by the UE, and "⌊ ⌋" denotes a floor operator that provides the next lower integer value.

In general, the UE may determine the number of HARQ processes that it can support based on any function(s) of resources available at the UE, e.g., for non-GBR traffic or both GBR traffic and non-GBR traffic. The available resources may be mapped directly or indirectly to the number of supported HARQ processes.

The number of HARQ processes (Z) supported by the UE may be any value from 0 to M, or $0 \leq Z \leq M$, where M is the number of HARQ processes available in the system. For example, Z may be one of nine possible values from 0 to 8 for a case in which M=8 HARQ processes are available in the system. Z may then be conveyed with four bits.

The UE may send a data control request to the Node B to ask the Node B to use no more than Z HARQ processes to send data to the UE. The UE may send the data control request in various manners. In one design, the UE may send the data control request via Medium Access Control (MAC), which may be responsible for supporting HARQ. In this design, the UE may generate a MAC control element containing Z and may send the MAC control element to the Node B. In another design, the UE may send the data control request via an upper-layer message, e.g., a Layer 3 (L3) message. In yet another design, the UE may send Z via a channel quality indicator (CQI) report. One of $2^B$ possible codewords may be sent in a B-bit CQI report. M+1 codewords may be reserved for conveying Z, and remaining codewords may be used to send CQI information. The UE may send Z in a CQI report by using one of the M+1 codewords reserved for conveying Z. The UE may also send a data control request in other manners.

Figure 4:
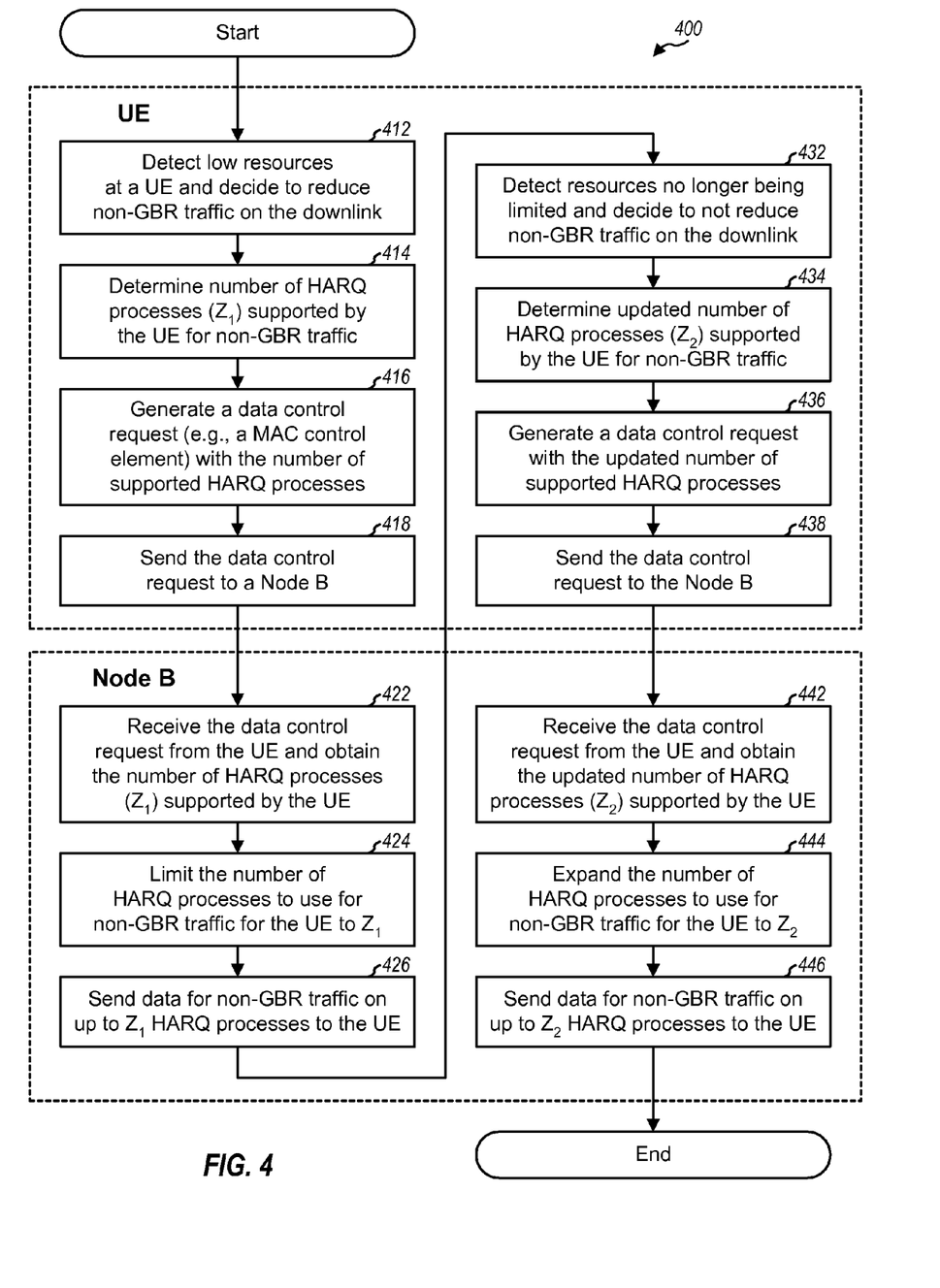
FIG. 4 shows a process for controlling data transmission based on HARQ.

FIG. 4 shows a design of a process 400 for controlling data transmission based on HARQ. The UE may detect low resources at the UE and may decide to reduce/throttle non-GBR traffic on the downlink (block 412). The UE may determine the number of HARQ processes ($Z_1$) supported by the UE for non-GBR traffic, e.g., based on the resources available at the UE for non-GBR traffic (block 414). The UE may generate a data control request (e.g., a MAC control element) with the number of supported HARQ processes (block 416) and may send the data control request to the Node B (block 418).

The Node B may receive the data control request and may obtain the number of HARQ processes ($Z_1$) supported by the UE (block 422). The Node B may then limit the number of HARQ processes to use for non-GBR traffic for the UE to $Z_1$, e.g., until further notice by the UE (block 424). The Node B may send data for non-GBR traffic on up to $Z_1$ HARQ processes to the UE (block 426).

The UE may detect resources no longer being limited at the UE and may decide to not reduce non-GBR traffic on the downlink (block 432). The UE may determine an updated number of HARQ processes ($Z_2$) supported by the UE for non-GBR traffic (block 434). The UE may generate a data control request with the updated number of supported HARQ processes (block 436) and may send the data control request to the Node B (block 438).

The Node B may receive the data control request and may obtain the updated number of HARQ processes ($Z_2$) supported by the UE (block 442). The Node B may then expand the number of HARQ processes to use for non-GBR traffic for the UE to $Z_2$, e.g., until further notice by the UE (block 444). The Node B may send data for non-GBR traffic on up to $Z_2$ HARQ processes to the UE (block 446).

In the design shown in FIG. 4, the UE may control the amount of non-GBR traffic on the downlink by updating the number of HARQ processes (Z) supported by the UE, as needed, and sending the updated Z to the Node B. The Node B may limit the number of HARQ processes to use for non-GBR traffic for the UE to the latest Z received from the UE.

In another design, the UE may inform the Node B to increase or decrease Z by a predetermined amount. For example, the UE may send an UP request to increase the current Z by one or a DOWN request to decrease the current Z by one. The Node B may maintain the current Z for the UE, may increase Z whenever an UP request is received from the UE, and may decrease Z whenever a DOWN request is received.

In one design, a data control request sent by the UE may be "sticky" and may be valid until another data control request is sent by the UE. In another design, a data control request sent by the UE may be valid for a predetermined period of time and may expire automatically after the predetermined time period. The Node B may apply the data control request for the predetermined time period and may revert to a normal setting (e.g., using all M available HARQ processes) when the data control request expires. A data control request may also be applied in other manners.

In one design, the rate at which the UE can send data control requests to the Node B may be limited in order to reduce signaling overhead for the data control requests. In one design, the UE may send a new data control request after waiting at least Q seconds from the prior data control request, where Q may be any suitable value. In another design, the UE may send up to S data control requests per unit of time, where S may be any suitable value. The unit of time may also cover any suitable time duration.

In another design, the UE does not send data control requests for the number of HARQ processes that it can support. Instead, the Node B may estimate the number of HARQ processes (Z) that the UE can support based on NAKs received for HARQ transmissions sent to the UE. The UE may send more NAKs when resources are low at the UE. The Node B may keep track of the number of NAKs received from the UE and may determine Z based on the received NAKs. For example, the Node B may decrease Z by a predetermined amount if NAKs are received for P1 percent or more of HARQ transmissions sent after the target termination. The Node B may increase Z by a predetermined amount if NAKs are received for P2 percent or less of HARQ transmissions sent after the target termination, where P1>P2. The Node B may also update Z in other manners based on NAKs and/or other information.

Figure 5:
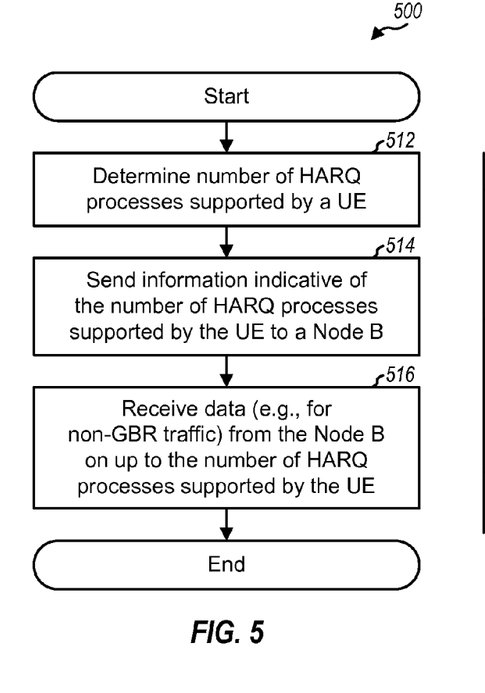
FIG. 5 shows a process for receiving data.

FIG. 5 shows a design of a process 500 for receiving data in a wireless communication system. Process 500 may be performed by a UE for data transmission on the downlink (as described below) or by a Node B for data transmission on the uplink.

The UE may determine the number of HARQ processes supported by the UE (block 512). In one design, the UE may determine the number of supported HARQ processes (Z) based on the number of HARQ processes (M) available in the system, an overall peak rate ($R_{max}$) for all available HARQ processes, and a peak rate ($R_{supported}$) supported by the UE. In another design, the UE may determine resources used for GBR traffic, determine resources available for non-GBR traffic based on the resources used for GBR traffic and the total resources at the UE, and determine the number of supported HARQ processes based on the resources available for non-GBR traffic. The UE may also determine the number of supported HARQ processes in other manners.

The UE may send information indicative of the number of HARQ processes supported by the UE to a Node B (block 514). In one design, the UE may generate a MAC control element carrying the number of supported HARQ processes and may send the MAC control element to the Node B. In other designs, the UE may send the number of supported HARQ processes using messages at other layers or via other mechanisms. The UE may also send a change in the number of supported HARQ processes, e.g., an UP or DOWN request.

The UE may receive data from the Node B on up to the number of HARQ processes supported by the UE (block 516). In one design, the UE may receive data for non-GBR traffic on up to the number of supported HARQ processes. The UE may receive data for GBR traffic on up to all HARQ processes available in the system. In another design, the UE may receive data for both GBR traffic and non-GBR traffic on up to the number of supported HARQ processes. The UE may also receive data for GBR traffic and non-GBR traffic in other manners.

Figure 6:
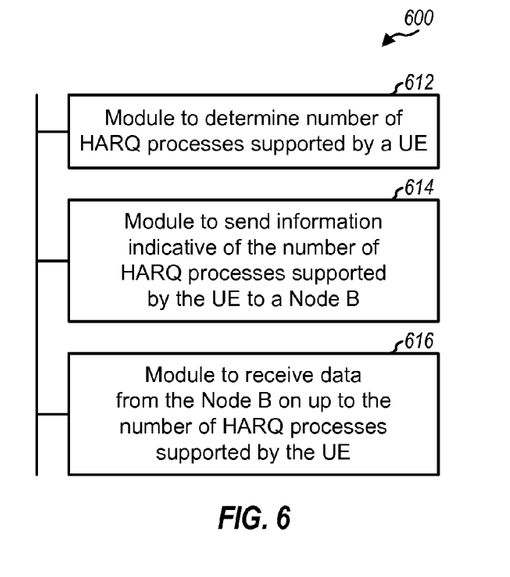
FIG. 6 shows an apparatus for receiving data.

FIG. 6 shows a design of an apparatus 600 for receiving data in a wireless communication system. Apparatus 600 includes a module 612 to determine the number of HARQ processes supported by a UE, a module 614 to send information indicative of the number of HARQ processes supported by the UE to a Node B, and a module 616 to receive data from the Node B on up to the number of HARQ processes supported by the UE.

Figure 7:
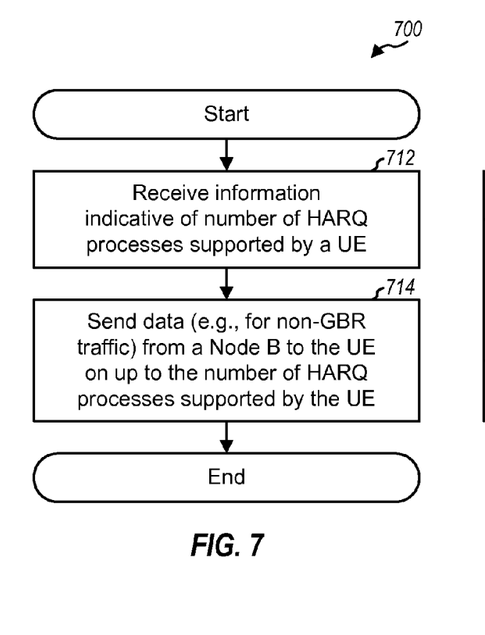
FIG. 7 shows a process for sending data.

FIG. 7 shows a design of a process 700 for sending data in a wireless communication system. Process 700 may be performed by a Node B for data transmission on the downlink (as described below) or by a UE for data transmission on the uplink.

The Node B may receive information indicative of the number of HARQ processes supported by a UE (block 712). In one design, the Node B may receive a MAC control element carrying the number of supported HARQ processes. The Node B may also receive the number of supported HARQ processes via other messages at other layers. In one design, the Node B may limit the number of HARQ processes to use to send data to the UE based on the number of supported HARQ processes until information indicative of an updated number of supported HARQ processes is received from the UE. In another design, the Node B may limit the number of HARQ processes to use to send data to the UE for a predetermined time period.

The Node B may send data to the UE on up to the number of HARQ processes supported by the UE (block 714). In one design, the Node B may send data for non-GBR traffic on up to the number of HARQ processes supported by the UE and may send data for GBR traffic on up to all HARQ processes available in the system. In another design, the Node B may send data for both GBR traffic and non-GBR on up to the number of HARQ processes supported by the UE. The Node B may also send data for GBR traffic and non-GBR traffic in other manners.

Figure 8:
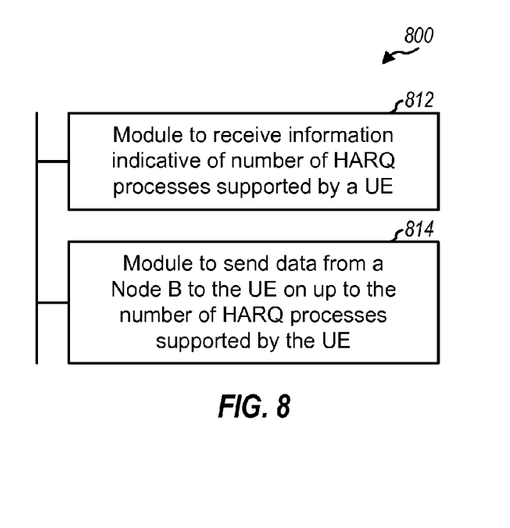
FIG. 8 shows an apparatus for sending data.

FIG. 8 shows a design of an apparatus 800 for sending data in a wireless communication system. Apparatus 800 includes a module 812 to receive information indicative of the number of HARQ processes supported by a UE, and a module 814 to send data from a Node B to the UE on up to the number of HARQ processes supported by the UE.

The modules in FIGS. 6 and 8 may comprise processors, electronics devices, hardware devices, electronics components, logical circuits, memories, software codes, firmware codes, etc., or any combination thereof.

For clarity, the techniques have been described for controlling data transmission on the downlink. The techniques may also be used to control data transmission on the uplink. In one design, the UE may send information indicative of the number of HARQ processes supported by the UE for data transmission on the uplink. The Node B may then schedule the UE for up to the number of HARQ processes supported by the UE on the uplink. The UE may send data, as scheduled, to the Node B. This design may ensure that radio resources allocated to the UE for data transmission on the uplink can be utilized by the UE.

The techniques described herein may provide certain advantages. First, the techniques may provide flexibility for UE implementation and may possibly reduce cost. For example, the UE may share certain resources among different applications to achieve multiplexing gain. Second, the UE may be protected under overload scenarios. Third, the techniques may provide an effective means for the UE to cope with a high peak-to-average data rate ratio without having to over-design the UE with a large amount of resources. Fourth, the UE may be able to provide better user experience. For example, the UE may be able to launch an application faster by temporarily reducing non-GBR traffic when the application is launched. Other advantages may also be obtained with the techniques described herein.

Figure 9:
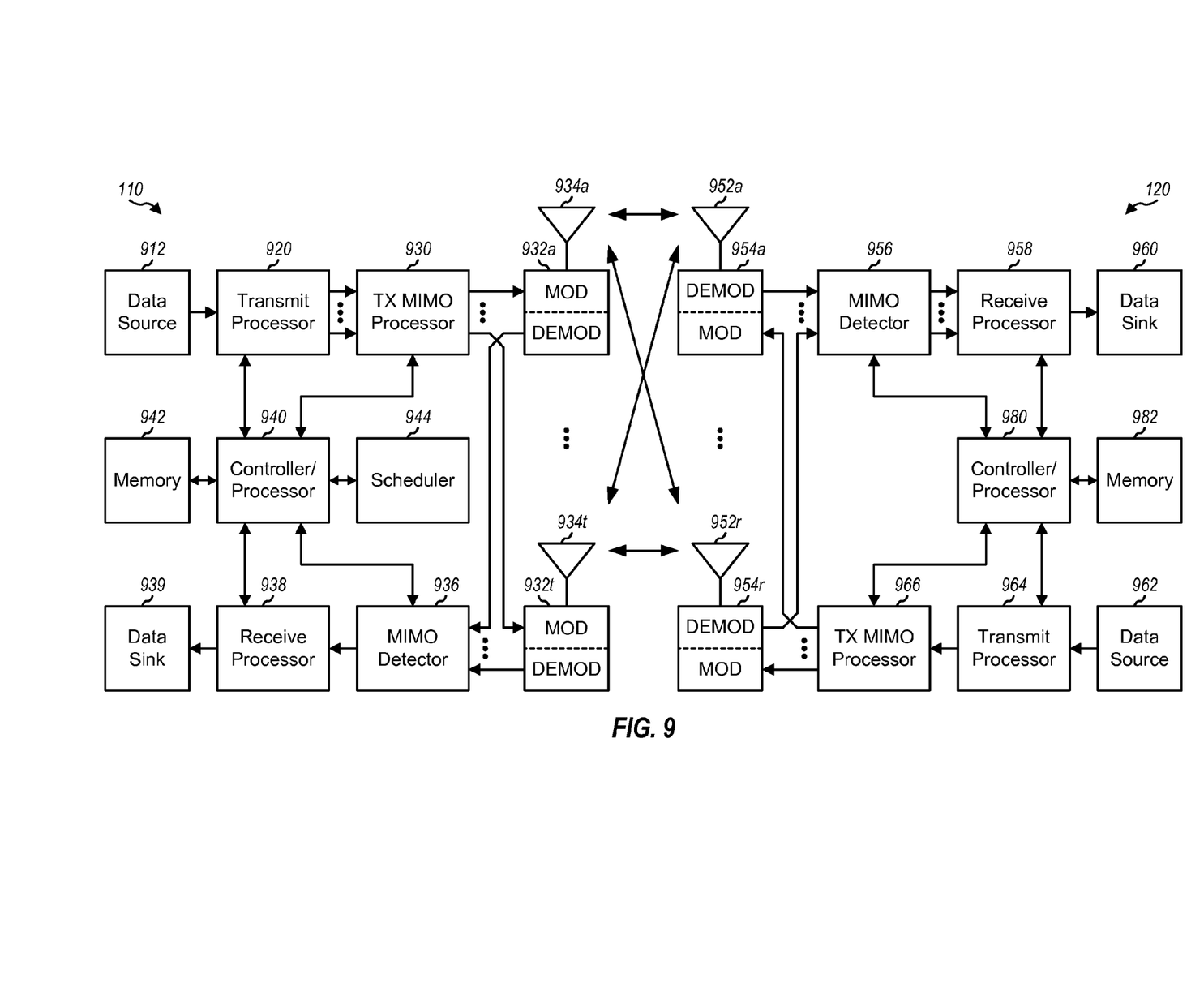
FIG. 9 shows a block diagram of a Node B and a UE.

FIG. 9 shows a block diagram of a design of a Node B 110 and a UE 120, which may be one of the Node Bs and one of the UEs in FIG. 1. In this design, Node B 110 is equipped with T antennas 934a through 934t, and UE 120 is equipped with R antennas 952a through 952r, where in general T≥1 and R≥1.

At Node B 110, a transmit processor 920 may receive packets of data from a data source 912 for UE 120. Transmit processor 920 may process (e.g., encode, interleave, and modulate) the packets for transmission on one or more HARQ processes, which may be determined based on the number of HARQ processes supported by UE 120. Transmit processor 920 may also receive and process control information from a controller/processor 940 and provide control symbols. A transmit (TX) multiple-input multiple-output (MIMO) processor 930 may perform spatial processing (e.g., precoding) on the data symbols, the control symbols, and/or pilot symbols, if applicable, and may provide T output symbol streams to T modulators (MODs) 932a through 932t. Each modulator 932 may process a respective output symbol stream (e.g., for OFDM, SC-FDM, CDMA, etc.) to obtain an output sample stream. Each modulator 932 may further process (e.g., convert to analog, amplify, filter, and upconvert) the output sample stream to obtain a downlink signal. T downlink signals from modulators 932a through 932t may be transmitted via T antennas 934a through 934t, respectively.

At UE 120, antennas 952a through 952r may receive the downlink signals from Node B 110 and may provide received signals to demodulators (DEMODs) 954a through 954r, respectively. Each demodulator 954 may condition (e.g., filter, amplify, downconvert, and digitize) a respective received signal to obtain input samples. Each demodulator 954 may further process the input samples (e.g., for OFDM, SC-FDM, CDMA, etc.) to obtain received symbols. A MIMO detector 956 may obtain received symbols from all R demodulators 954a through 954r, perform MIMO detection on the received symbols if applicable, and provide detected symbols. A receive processor 958 may process (e.g., demodulate, deinterleave, and decode) the detected symbols, provide decoded packets for UE 120 to a data sink 960, and provide decoded control information to a controller/processor 980.

On the uplink, at UE 120, a transmit processor 964 may receive packets of data from a data source 962 and control information (e.g., information indicative of the number of HARQ processes supported by UE 120) from controller/processor 980. Transmit processor 964 may process the packets and control information and provide data symbols and control symbols, respectively. The symbols from transmit processor 964 may be precoded by a TX MIMO processor 966 if applicable, further processed by modulators 954a through 954r, and transmitted to Node B 110. At Node B 110, the uplink signals from UE 120 may be received by antennas 934, processed by demodulators 932, detected by a MIMO detector 936 if applicable, and further processed by a receive processor 938 to obtain the decoded packets and control information transmitted by UE 120.

Controllers/processors 940 and 980 may direct the operation at Node B 110 and UE 120, respectively. Controller/processor 940 may control transmission of data for GBR traffic and/or non-GBR traffic to UE 120 based on the number of HARQ processes supported by UE 120. Processor 940 and/or other processors and modules at Node B 110 may perform or direct part of process 400 in FIG. 4 for the Node B, process 700 in FIG. 7, and/or other processes for the techniques described herein. Processor 980 and/or other processors and modules at UE 120 may perform or direct part of process 400 in FIG. 4 for the UE, process 500 in FIG. 5, and/or other processes for the techniques described herein. Memories 942 and 982 may store data and program codes for Node B 110 and UE 120, respectively. A scheduler 944 may schedule UEs for data transmission on the downlink and/or uplink and may provide resource grants for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of receiving data in a wireless communication system, comprising:
   determining a number of hybrid automatic retransmission (HARQ) processes supported by a user equipment (UE);
   sending information indicative of the number of HARQ processes supported by the UE to a base station; and
   receiving data from the base station through one or more HARQ processes, wherein the number of the one or more HARQ processes does not exceed the number of HARQ processes supported by the UE.

2. The method of claim 1, wherein determining the number of HARQ processes supported by the UE comprises determining the number of HARQ processes supported by the UE based on total number of HARQ processes available in the system, an overall peak rate for all available HARQ processes, and a peak rate supported by the UE.

3. The method of claim 1, wherein determining the number of HARQ processes supported by the UE comprises
    determining resources available at the UE for non-guaranteed bit rate (non-GBR) traffic, and
    determining the number of HARQ processes supported by the UE based on the resources available for non-GBR traffic.

4. The method of claim 3, wherein determining the number of HARQ processes supported by the UE further comprises
    determining resources used for guaranteed bit rate (GBR) traffic, and
    determining the resources available for non-GBR traffic based on the resources used for GBR traffic and total resources at the UE.

5. The method of claim 1, wherein sending information indicative of the number of HARQ processes supported by the UE comprises
    generating a Medium Access Control (MAC) control element carrying the number of HARQ processes supported by the UE, and
    sending the MAC control element to the base station.

6. The method of claim 1, wherein receiving the data comprises receiving data for non-guaranteed bit rate (non-GBR) traffic from the base station through the one or more HARQ processes.

7. The method of claim 6, further comprising receiving data for guaranteed bit rate (GBR) traffic from the base station through one or more HARQ processes available in the system.

8. The method of claim 1, wherein receiving the data comprises receiving data for both guaranteed bit rate (GBR) traffic and non-guaranteed bit rate (non-GBR) traffic through the one or more HARQ processes.

9. An apparatus for wireless communication, comprising:
    a wireless transceiver; and
    at least one processor coupled to the wireless transceiver and configured to determine a number of hybrid automatic retransmission (HARQ) processes supported by a user equipment (UE), to send information indicative of the number of HARQ processes supported by the UE to a base station through the wireless transceiver, and to receive data from the base station through one or more HARQ processes, wherein the number of the one or more HARQ processes does not exceed the number of HARQ processes supported by the UE.

10. The apparatus of claim 9, wherein the at least one processor is configured to determine resources available at the UE for non-guaranteed bit rate (non-GBR) traffic, and to determine the number of HARQ processes supported by the UE based on the resources available for non-GBR traffic.

11. The apparatus of claim 9, wherein the at least one processor is configured to generate a Medium Access Control (MAC) control element carrying the number of HARQ processes supported by the UE, and to send the MAC control element to the base station.

12. The apparatus of claim 9, wherein the at least one processor is configured to receive data for non-guaranteed bit rate (non-GBR) traffic from the base station through the one or more HARQ processes.

13. The apparatus of claim 9, wherein the at least one processor is configured to receive data for both guaranteed bit rate (GBR) traffic and non-guaranteed bit rate (non-GBR) traffic through the one or more HARQ processes.

14. An apparatus for wireless communication, comprising:
    processing means for determining a number of hybrid automatic retransmission (HARQ) processes supported by a user equipment (UE); and
    a wireless transceiver communicatively coupled to the processing means, the wireless transceiver including:
        means for sending information indicative of the number of HARQ processes supported by the UE to a base station; and
        means for receiving data from the base station through one or more HARQ processes,
    wherein the number of the one or more HARQ processes does not exceed the number of HARQ processes supported by the UE.

15. The apparatus of claim 14, wherein the means for determining the number of HARQ processes supported by the UE comprises
    means for determining resources available at the UE for non-guaranteed bit rate (non-GBR) traffic, and
    means for determining the number of HARQ processes supported by the UE based on the resources available for non-GBR traffic.

16. The apparatus of claim 14, wherein the means for sending information indicative of the number of HARQ processes supported by the UE comprises
    means for generating a Medium Access Control (MAC) control element carrying the number of HARQ processes supported by the UE, and
    means for sending the MAC control element to the base station.

17. The apparatus of claim 14, wherein the means for receiving the data comprises means for receiving data for non-guaranteed bit rate (non-GBR) traffic from the base station through the one or more HARQ processes.

18. The apparatus of claim 14, wherein the means for receiving the data comprises means for receiving data for both guaranteed bit rate (GBR) traffic and non-guaranteed bit rate (non-GBR) traffic through the one or more HARQ processes.

19. A computer program product, comprising:
    a non-transitory computer-readable medium comprising:
        code stored on the medium for causing at least one computer to determine a number of hybrid automatic retransmission (HARQ) processes supported by a user equipment (UE),
        code stored on the medium for causing the at least one computer to send information indicative of the number of HARQ processes supported by the UE to a base station, and
        code stored on the medium for causing the at least one computer to receive data from the base station through one or more HARQ processes, wherein the number of the one or more HARQ processes does not exceed the number of HARQ processes supported by the UE.

20. A method of sending data in a wireless communication system, comprising:
    receiving information indicative of a number of hybrid automatic retransmission (HARQ) processes supported by a user equipment (UE); and
    sending data from a base station to the UE through one or more HARQ processes, wherein the number of the one or more HARQ processes does not exceed the number of HARQ processes supported by the UE.

21. The method of claim 20, further comprising limiting the number of the one or more HARQ processes used to send the data to the UE to the number of HARQ processes supported by the UE until information indicative of an updated number of HARQ processes supported by the UE is received from the UE.

22. The method of claim 20, further comprising limiting the number of the one or more HARQ processes used to send the data to the UE to the number of HARQ processes supported by the UE for a predetermined period of time.

23. The method of claim 20, wherein receiving the information indicative of the number of HARQ processes supported by the UE comprises receiving a Medium Access Control (MAC) control element carrying the number of HARQ processes supported by the UE.

24. The method of claim 20, wherein sending the data comprises sending data for non-guaranteed bit rate (non-GBR) traffic from the base station to the through the one or more HARQ processes.

25. The method of claim 24, further comprising sending data for guaranteed bit rate (GBR) traffic from the base station to the UE through one or more HARQ processes available in the system.

26. The method of claim 20, wherein sending the data comprises sending data for both guaranteed bit rate (GBR) traffic and non-guaranteed bit rate (non-GBR) traffic from the base station to the UE through the one or more HARQ processes.

27. An apparatus for wireless communication, comprising:
a wireless transceiver; and
at least one processor communicatively coupled to the wireless transceiver and configured to receive information indicative of a number of hybrid automatic retransmission (HARQ) processes supported by a user equipment (UE), and to send data from a base station to the UE through one or more HARQ processes, wherein the number of the one or more HARQ processes does not exceed the number of HARQ processes supported by the UE.

28. The apparatus of claim 27, wherein the at least one processor is configured to receive a Medium Access Control (MAC) control element carrying the number of HARQ processes supported by the UE.

29. The apparatus of claim 27, wherein the at least one processor is configured to send data for non-guaranteed bit rate (non-GBR) traffic from the base station to the UE through the one or more HARQ processes.

30. The apparatus of claim 27, wherein the at least one processor is configured to send data for both guaranteed bit rate (GBR) traffic and non-guaranteed bit rate (non-GBR) traffic from the base station to the UE through the one or more HARQ processes.

31. A method of exchanging data in a wireless communication system, comprising:
determining a number of hybrid automatic retransmission (HARQ) processes supported by a user equipment (UE); and
exchanging data through one or more HARQ processes, wherein the number of the one or more HARQ processes does not exceed the number of HARQ processes supported by the UE.

32. The method of claim 31, wherein exchanging the data comprises receiving data from a base station through the one or more HARQ processes.

33. The method of claim 31, wherein exchanging the data comprises sending data from the UE to a base station through the one or more HARQ processes.

34. The method of claim 31, wherein determining the number of HARQ processes supported by the UE comprises determining the number of HARQ processes supported by the UE based on resources available at the UE for non-guaranteed bit rate (non-GBR) traffic.

35. The method of claim 31, wherein determining the number of HARQ processes supported by the UE comprises determining the number of HARQ processes supported by the UE based on negative acknowledgements (NAKs) received from the UE for prior transmissions of data sent to the UE.

36. An apparatus for wireless communication, comprising:
means for transmitting and receiving data or control information wirelessly;
means for determining a number of hybrid automatic retransmission (HARQ) processes supported by a user equipment (UE); and
means for exchanging data through one or more HARQ processes, wherein the number of the one or more HARQ processes does not exceed the number of HARQ processes supported by the UE.

37. The apparatus of claim 36, wherein the means for exchanging the data receives data from a base station through the one or more HARQ processes.

38. The apparatus of claim 36, wherein the means for exchanging the data sends data from the UE to a base station through the one or more HARQ processes.

39. The apparatus of claim 36, wherein the means for determining the number of HARQ processes supported by the UE determines the number of HARQ processes supported by the UE based on resources available at the UE for non-guaranteed bit rate (non-GBR) traffic.

40. The apparatus of claim 36, wherein the means for determining the number of HARQ processes supported by the UE determines the number of HARQ processes supported by the UE based on negative acknowledgements (NAKs) received from the UE for prior transmissions of data sent to the UE.

41. An apparatus for wireless communication, comprising:
a processing system configured to:
determine a number of hybrid automatic retransmission (HARQ) processes supported by a user equipment (UE); and
exchanging data through one or more HARQ processes, wherein the number of the one or more HARQ processes does not exceed the number of HARQ processes supported by the UE.

42. The apparatus of claim 41, wherein exchanging the data comprises receiving data from a base station through the one or more HARQ processes.

43. The apparatus of claim 41, wherein exchanging the data comprises sending data from the UE to a base station through the one or more HARQ processes.

44. The apparatus of claim 41, wherein determining the number of HARQ processes supported by the UE comprises determining the number of HARQ processes supported by the UE based on resources available at the UE for non-guaranteed bit rate (non-GBR) traffic.

45. The apparatus of claim 41, wherein determining the number of HARQ processes supported by the UE comprises determining the number of HARQ processes supported by the UE based on negative acknowledgements (NAKs) received from the UE for prior transmissions of data sent to the UE.

46. A computer program product, comprising:
a non-transitory computer-readable medium comprising code for:

determining number of hybrid automatic retransmission (HARQ) processes supported by a user equipment (UE); and exchanging data through one or more HARQ processes, wherein the number of the one or more HARQ processes does not exceed the number of HARQ processes supported by the UE.

47. An apparatus for wireless communication, comprising:
means for transmitting and receiving data or control information wirelessly;
means for receiving information indicative of a number of hybrid automatic retransmission (HARQ) processes supported by a user equipment (UE); and
means for sending data from a base station to the UE through one or more HARQ processes, wherein the number of the one or more HARQ processes does not exceed the number of HARQ processes supported by the UE.

48. The apparatus of claim 47, wherein the means for sending the data limits the number of the one or more HARQ processes used to send the data to the number of HARQ processes supported by the UE until information indicative of an updated number of HARQ processes supported by the UE is received from the UE.

49. The apparatus of claim 47, wherein the means for sending the data limits the number of the one or more HARQ processes to the number of HARQ processes supported by the UE for a predetermined period of time.

50. The apparatus of claim 47, wherein the means for receiving the information indicative of the number of HARQ processes supported by the UE is configured to receive a Medium Access Control (MAC) control element carrying the number of HARQ processes supported by the UE.

51. The apparatus of claim 47, wherein the means for sending the data sends data for non-guaranteed bit rate (non-GBR) traffic from the base station to the UE through the one or more HARQ processes.

52. The apparatus of claim 51, wherein the means for sending the data sends data for guaranteed bit rate (GBR) traffic from the base station to the UE through one or more HARQ processes available in the system.

53. The apparatus of claim 47, wherein the means for sending the data sends data for both guaranteed bit rate (GBR) traffic and non-guaranteed bit rate (non-GBR) traffic from the base station to the UE through the one or more HARQ processes.

54. A computer program product, comprising:
a non-transitory computer-readable medium comprising code for:
receiving information indicative of a number of hybrid automatic retransmission (HARQ) processes supported by a user equipment (UE); and
sending data from a base station to the UE through one or more HARQ processes, wherein the number of the one or more HARQ processes does not exceed the number of HARQ processes supported by the UE.

* * * * *